(12) United States Patent
Powell et al.

(10) Patent No.: US 6,553,940 B1
(45) Date of Patent: Apr. 29, 2003

(54) DOG KENNEL

(75) Inventors: Tony A. Powell, Raleigh, NC (US); Billy R. Powell, Holly Springs, NC (US); David R. Powell, Holly Springs, NC (US)

(73) Assignee: Powell & Powell Supply Co., Inc., Lillington, NC (US)

( * ) Notice: Subject to any disclaimer, the term of this patent is extended or adjusted under 35 U.S.C. 154(b) by 0 days.

(21) Appl. No.: 10/068,493

(22) Filed: Feb. 5, 2002

(51) Int. Cl.[7] .................................................. A01K 1/00
(52) U.S. Cl. ....................................... 119/514; 513/512
(58) Field of Search ............................... 119/514, 513, 119/512, 474, 533, 461, 453, 843, 516; 256/25, 24, 26

(56) References Cited

U.S. PATENT DOCUMENTS

| | | | | |
|---|---|---|---|---|
| 1,330,404 A | * | 2/1920 | Sommer | 119/514 |
| 2,892,562 A | * | 6/1959 | Smithson | 119/461 |
| 3,648,980 A | * | 3/1972 | Taylor | 119/512 |
| 3,970,045 A | * | 7/1976 | Graham, Jr. | 119/514 |
| 4,140,080 A | * | 2/1979 | Snader | 119/453 |
| 4,201,157 A | * | 5/1980 | Lambert | 119/512 |
| 4,537,151 A | * | 8/1985 | Bolton | 119/512 |
| 4,819,582 A | * | 4/1989 | Lichvar | 119/474 |
| 4,917,047 A | * | 4/1990 | Wazeter, III | 119/474 |
| 6,192,834 B1 | * | 2/2001 | Kolozsvari | 119/474 |

* cited by examiner

Primary Examiner—Peter M. Poon
Assistant Examiner—Joan M. Olszewski
(74) Attorney, Agent, or Firm—Coats & Bennett, P.L.L.C.

(57) ABSTRACT

An animal or dog kennel kit comprising a plurality of panels that can be connected or coupled together to form an enclosure. The plurality of panels includes at least one relatively small panel and one relatively large panel. The relatively small panel can be nested or placed within the relatively large panel to form a compact package for economical shipment.

11 Claims, 6 Drawing Sheets

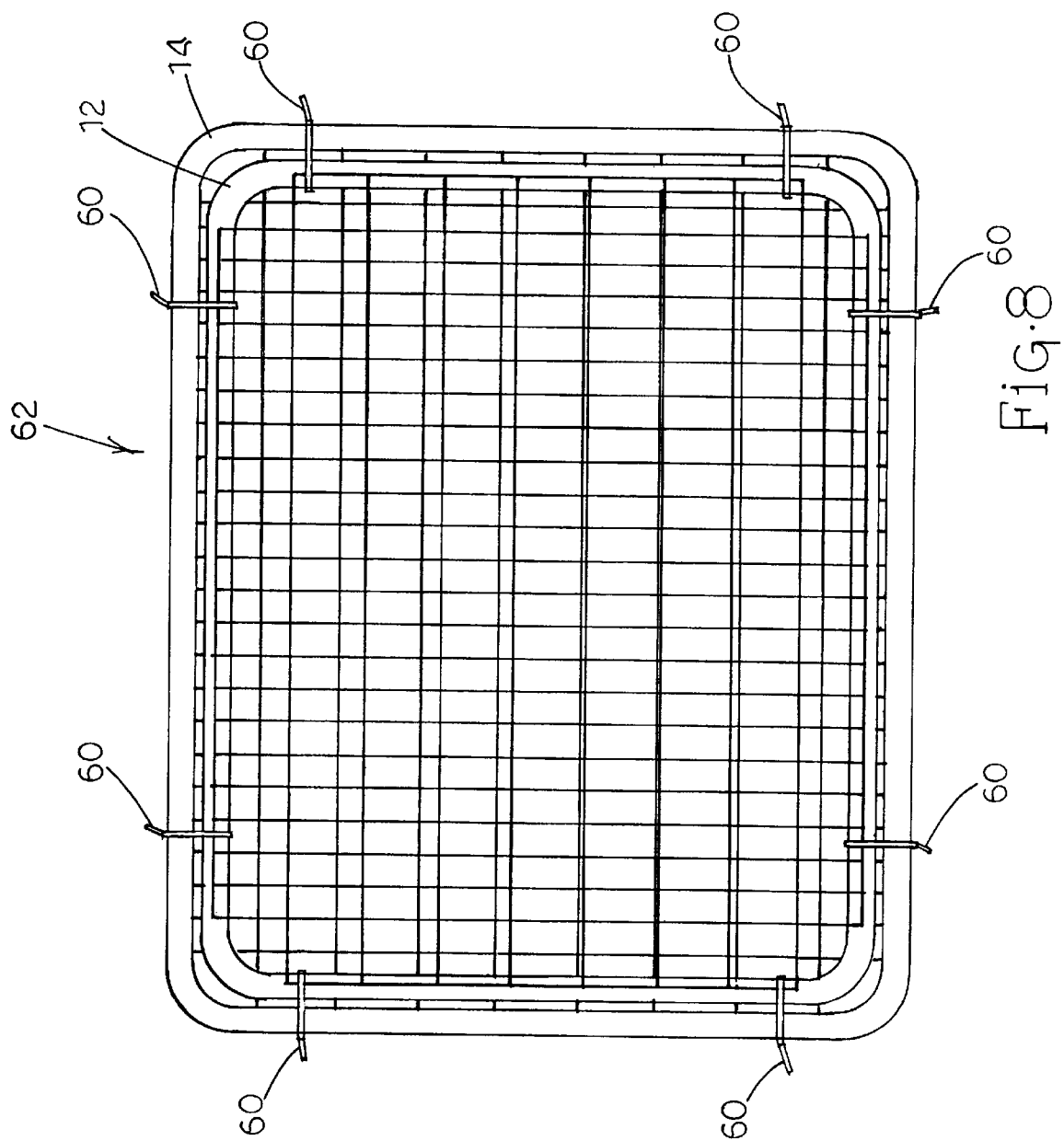

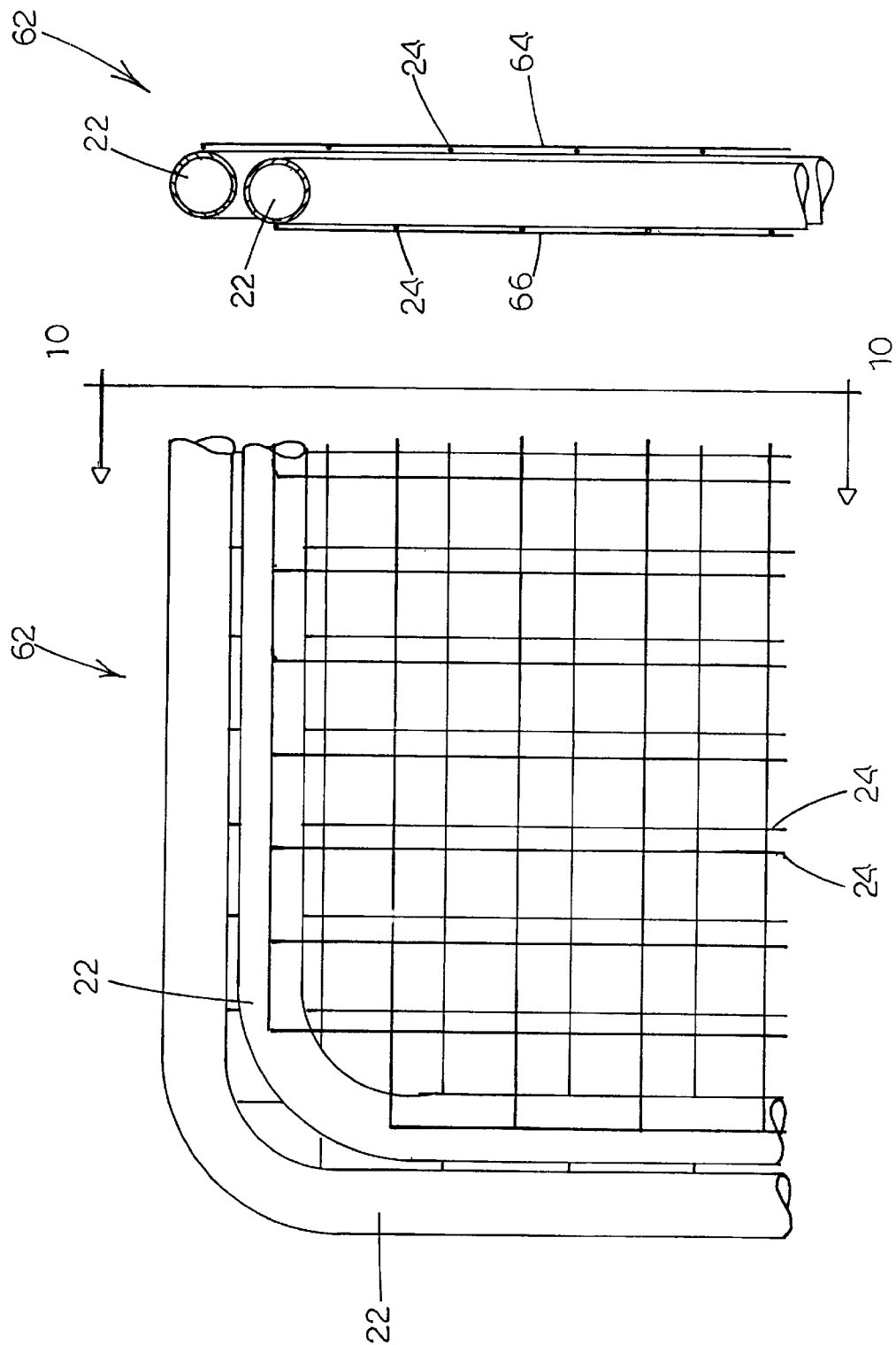

DOG KENNEL

FIELD OF THE INVENTION

The present invention relates to a dog kennel that is easy to ship and assemble.

BACKGROUND OF THE INVENTION

Modular or portable dog and animal kennels are known. They basically comprise a series of panels that can be coupled together to form an enclosure. However, these dog and animal kennels have a number of drawbacks and disadvantages. One of the principal disadvantages is that dog and animal kennel designs of the past have been such that the kennel cannot be formed or arranged into a compact package. As a result the shipping costs of these dog and animal kennels has been particularly high. Indeed, in some cases, it is conceivable that the shipping costs alone would exceed the costs of the raw materials that go into making the animal or dog kennel. This is particularly problematic for manufacturers that desire to provide a simple and inexpensive dog kennel that can be sold at mass merchandise outlets. Therefore, there has been and continues to be a need for a portable or modular dog kennel kit that can be assembled into a compact package where the kennel can be shipped economically.

SUMMARY OF THE INVENTION

The present invention comprises a set of panels adapted to be shipped in a nested fashion.

The panels are selectively secured to one another by two or more connectors. The two connectors may be chosen from three different types: a gate connector, a stepped connector, and a v-connector. To achieve the nested shipping structure, one of every two panels is smaller than the other to the extent that its exterior frame fits within the exterior frame of the larger panel.

BRIEF DESCRIPTION OF THE DRAWINGS

FIGS. 8–10 illustrate the panels of the present invention assembled for shipping according to one embodiment of the present invention.

DETAILED DESCRIPTION OF ONE EMBODIMENT OF THE INVENTION

Figure 1:
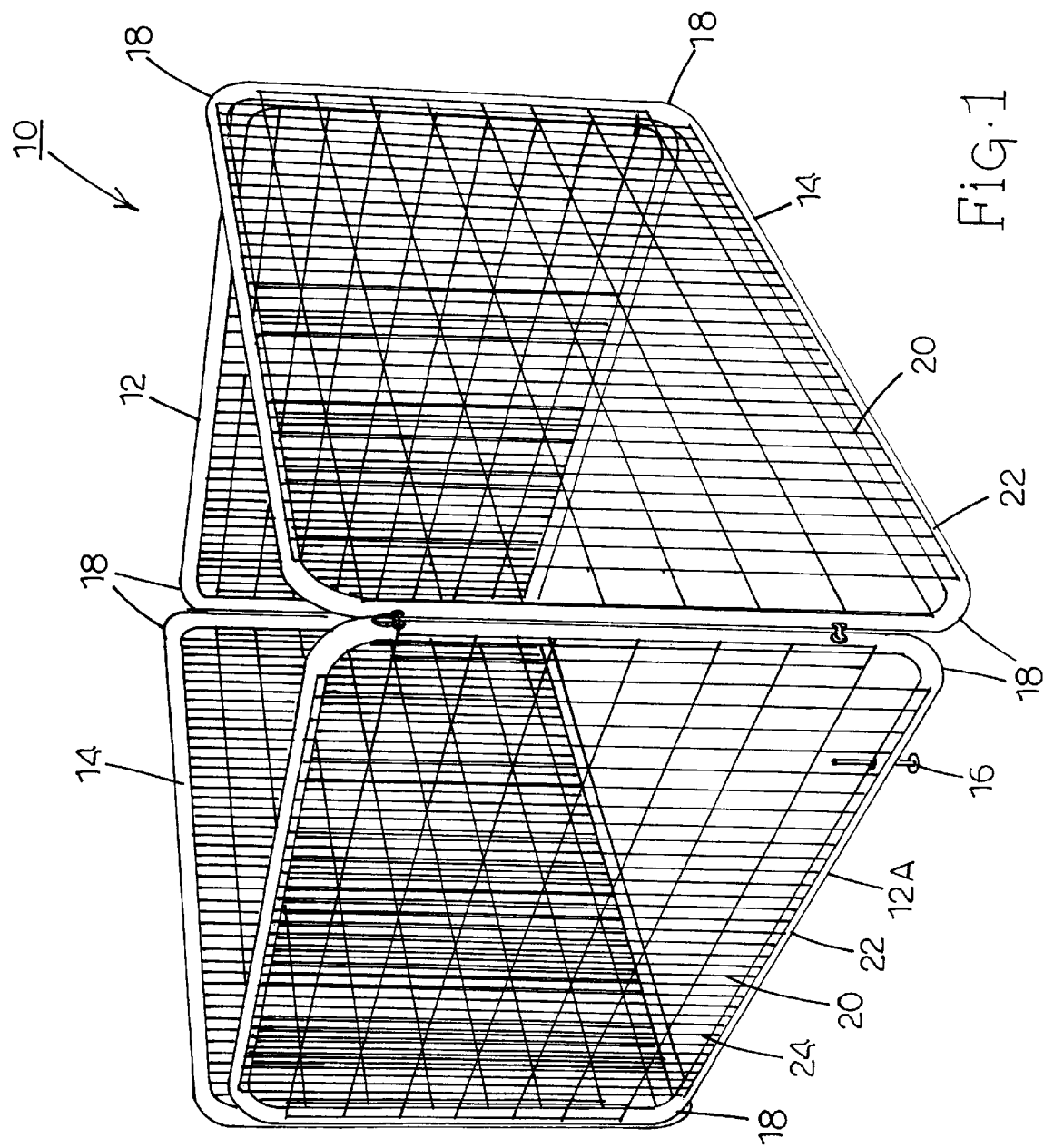
FIG. 1 illustrates a perspective view of an assembled kennel according to one embodiment of the present invention.

FIG. 1 illustrates a kennel 10, according to one embodiment of the present invention. Kennel 10 may comprise a plurality of panels 12 and 14. It is possible to use more than four panels 12, 14 so as to create shapes other than the rectangular kennel illustrated. Hexagons, octagons and the like are contemplated as well as are pentagons, heptagons, and the like. As can be seen, panels 12 are smaller in the vertical dimension and the horizontal dimension than panels 14. In the illustrated embodiment, panel 12A acts as a gate for the kennel 10. To help function as a gate, panel 12A comprises an adjustable support 16. Panels 12, 14 may comprise generally rounded corners 18, and an open wire mesh 20. In one embodiment, panels 12, 14 are made of metal tubes 22 and metal wires or a restraining structure 24. See FIG. 5, for example. In another embodiment, tubes 22 and wires 24 may be plastic or another material as needed or desired.

Therefore, it is appreciated that the panels 12 and 14 include an outer frame. In the case of the embodiment illustrated, the outer frame is made up of a tubular structure. The area defined by the mainframe of the small panel 12 is less than the area defined by the mainframe of the large panel 14. In fact, in a preferred embodiment, the design of the panels 12 and 14 are such that the smaller panels 12 can fit or nest within the boundaries of the mainframe of large panels 14.

Figure 2:
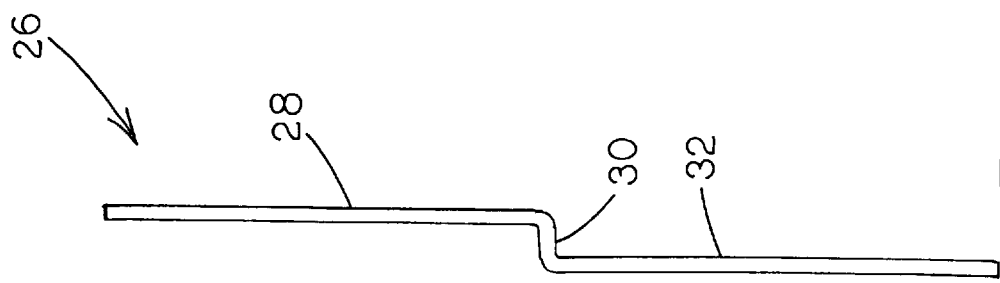

FIG. 2 illustrates a first type of connector, namely a stepped connector 26. Stepped connector 26 comprises a first generally vertical portion 28, a horizontal portion 30, and a second generally vertical portion 32, axially offset from the first generally vertical portion 28. The use of this connector will be explained in greater detail below.

Figure 3:
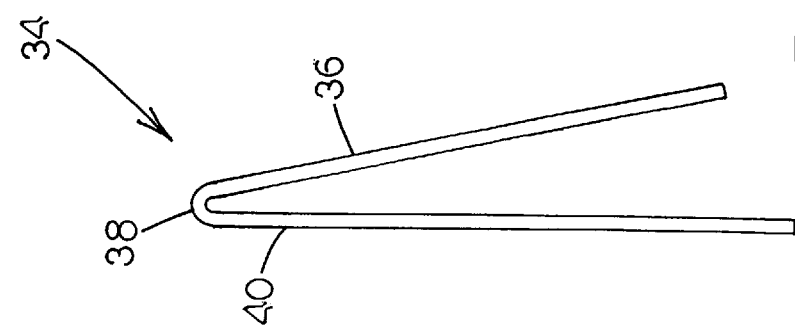

FIG. 3 illustrates a second type of connector, namely a v-connector 34. V-connector 34 comprises a first leg 36, an apex 38, and a second leg 40 arranged such that it forms a generally v-shaped connector.

Figure 4:
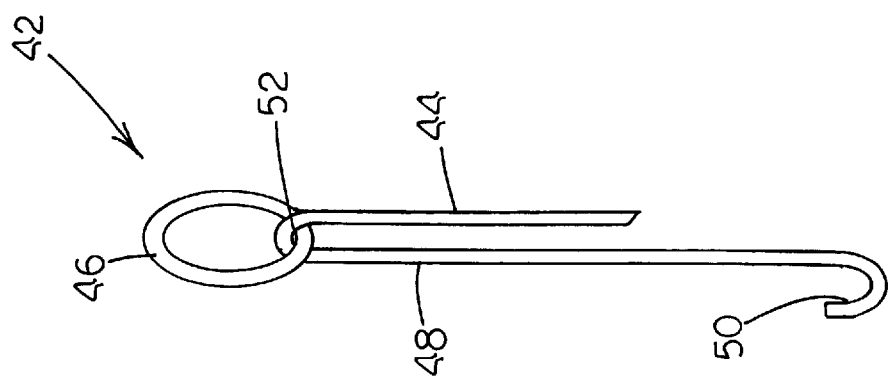
FIGS. 2–4 illustrate embodiments of the three connectors of the present invention.

FIG. 4 illustrates a third type of connector, namely a gate connector 42. Gate connector 42 comprises a first leg 44, a pull ring 46, a second leg 48, and a restraining hook 50. First and second legs 44, 48 are generally parallel, and offset by apex 52. Pull ring 46 is positioned generally near apex 52. Restraining hook 50 is positioned on a terminal end of second leg 48. First leg 44 is shorter than second leg 48.

In an exemplary embodiment, connectors 26, 34, and 42 are made from metal wire, but need not be. Any substantially rigid, durable material may be used if needed or desired.

Figure 5:
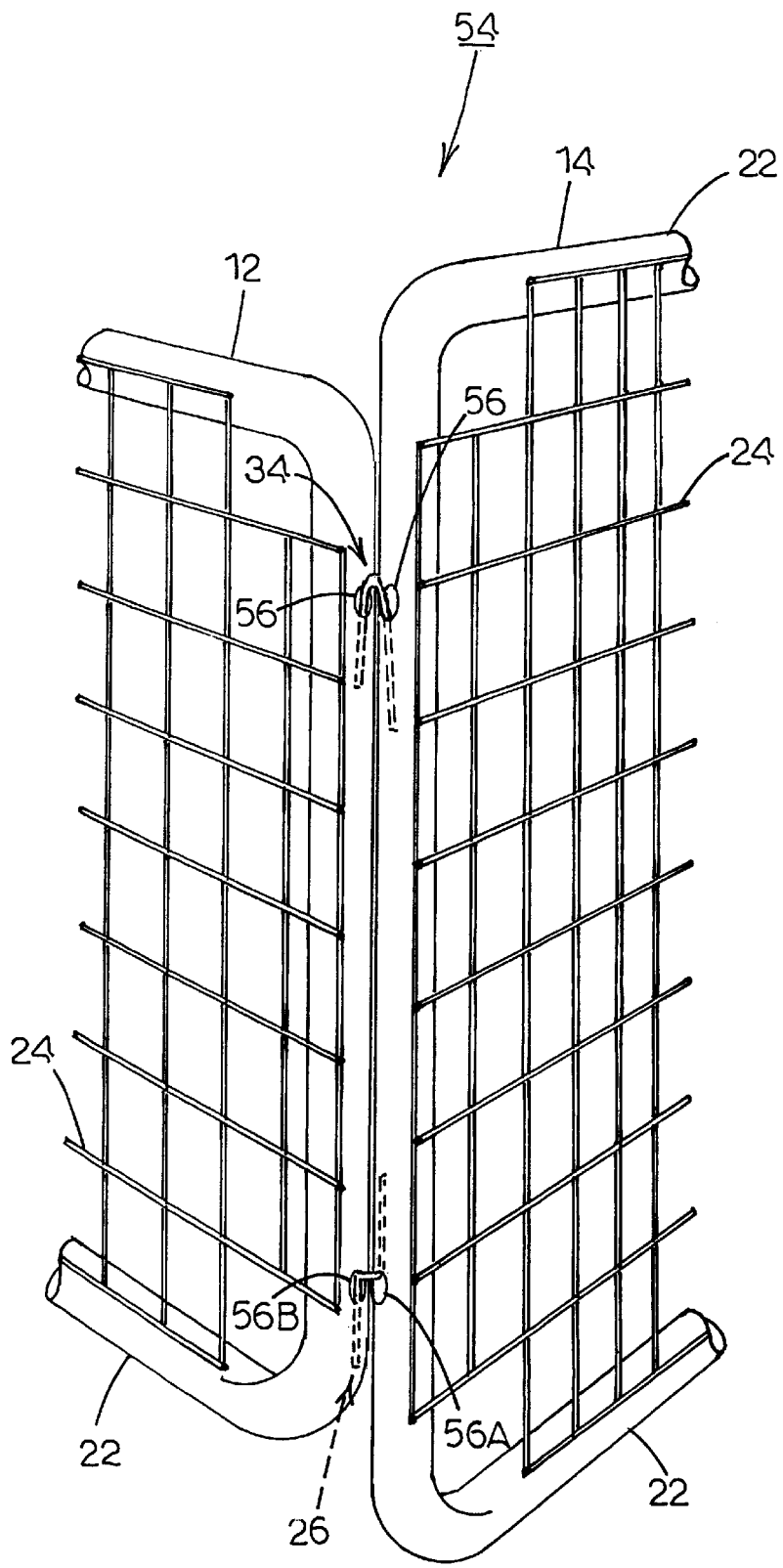
FIG. 5 illustrates one embodiment of a corner of the kennel of the present invention.

An exemplary corner 54 of the kennel 10 is illustrated in FIG. 5. Panels 12 and 14 include apertures 56 on the vertical portions of tubes 22. Connectors 26 and 34 may be used to connect panels 12 and 14 as illustrated. Specifically, step connector 26 may be used in a pair of lower apertures 56. Horizontal portion 30 rests on a lower portion of the aperture 56A in panel 14 and supports an upper portion of the aperture 56B in panel 12. In this manner, panel 12 is kept elevated above the ground or other support area. V-connector 34 may be used in a pair of upper apertures 56. By inserting the V-shaped connector 34 into the upper apertures 56 in each of the panels 12 and 14, as viewed in FIG. 5, this effectively connects the upper portions of the panel together and stabilizes the two panels. Note that one leg 36 is directed downwardly into the outer frame of panel 12 while the other leg 40 is directed downwardly through the mainframe of the other panel 14.

Figure 6:
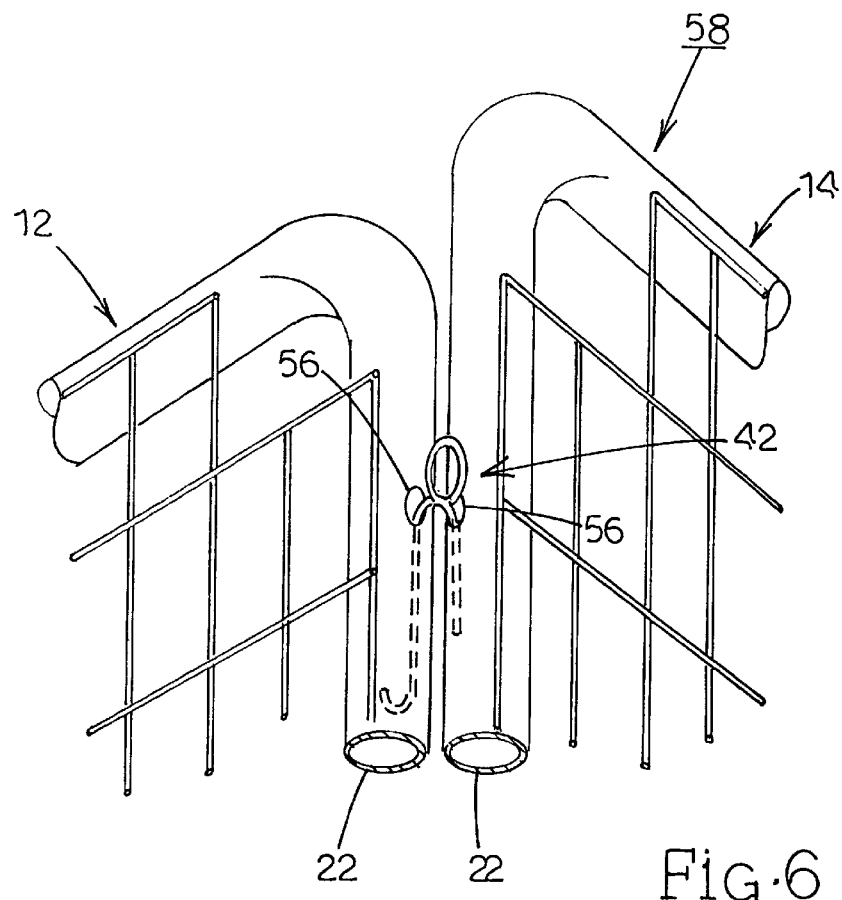
FIGS. 6 & 7 illustrate embodiments of top and bottom corners of a panel being used as a gate.
Figure 7:
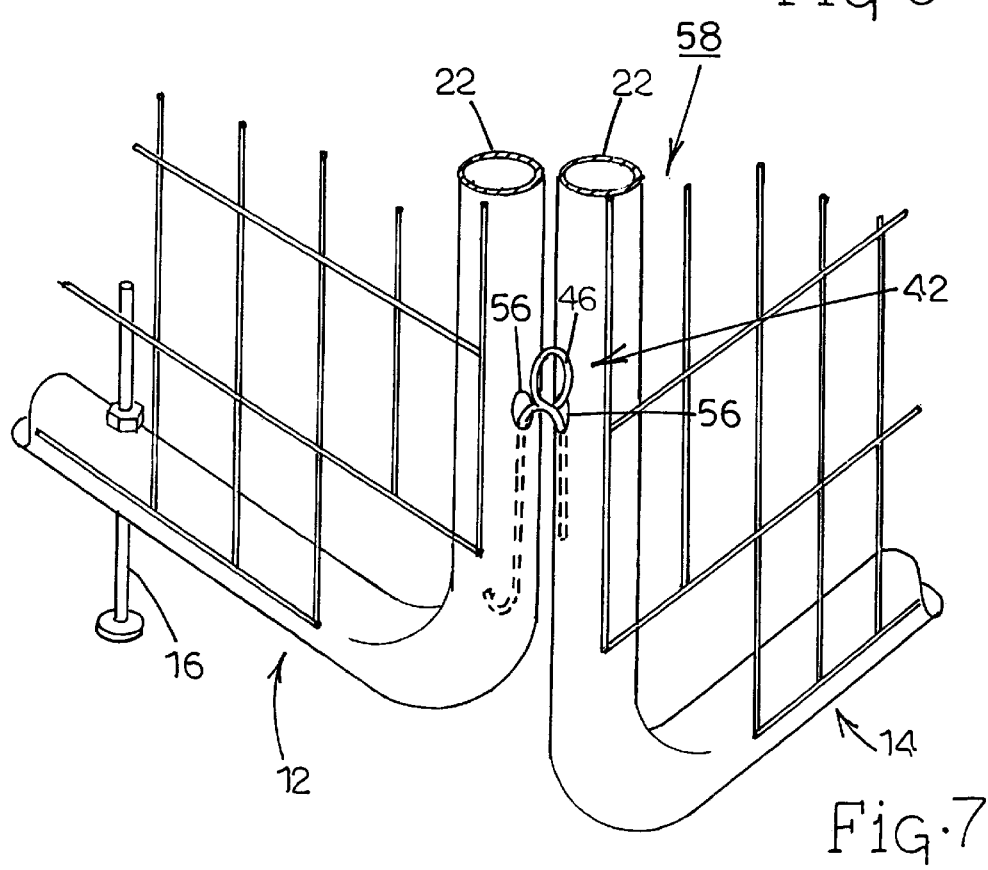

FIGS. 6 and 7 illustrate a gate corner 58 of the kennel 10. Gate connectors 42 are inserted into apertures 56. When the gate is closed, legs 44, 48 are positioned within differing tubes 22. However, when it is desired to open the gate, pull ring 46 is lifted, raising first leg 44 such that it slips out of aperture 56. Longer second leg 48 remains in one tube 22 and thus, panel 12 is now free to pivot on the connectors at the other corner 54 (FIG. 5). Restraining hook 50 helps insure that second leg 48 remains in its respective tube 22. When panel 12 is pivoted into an open position, optional support 16 may be used to keep the open end of the panel level and elevated off the ground or support surface. In one embodiment, optional support 16 comprises a bolt with a nut used to adjust the length of the bolt that extends below the tube 22 of the panel 12. The nut may be secured to the tube or mainframe such that as the bolt is turned clockwise or counterclockwise, the bolt will move with respect to the nut and main frame.

FIG. 8 illustrates the panels 12, 14 assembled for shipping into package 62. Specifically, because panel 12 is smaller than panel 14, it may be reversed and nested within panel 14. Wire ties 60 may be used to secure tubes 22 to one another in the manner illustrated and the package 62 remains relatively flat and easy to ship. Wire ties 60 may in fact be metal wire twisted about itself as is well understood or a conventional plastic tie.

For a better understanding of the nested relationship of panels 12 and 14, reference is made to FIGS. 9 and 10. FIG. 10 especially shows the reversed nature of the panels such that the wire mesh 24 is disposed on opposite sides 64, 66 of package 62.

Thus, it is appreciated that the dog or animal kennel 10 of the present invention includes a plurality of panels that in one embodiment, as illustrated in FIG. 1, are connected together to form an enclosure. In this embodiment, the kennel includes two relatively large panels 14 and two relatively small panels 12. The size, area, and configuration of the panels are such that one relatively small panel 12 can fit within or nest within a relatively large panel 14. This is illustrated in FIGS. 8, 9 and 10. Each panel includes a mainframe which in the case of the embodiment illustrated is a generally tubular mainframe. The tubular mainframe of the relatively small panels can fit within the confines of the tubular mainframe of the relatively large panels. As illustrated in FIG. 10 a portion of each panel lies within the same plane. In this configuration, that is the configuration shown in FIGS. 8, 9 and 10, the two panels, the relatively small panel and the relatively large panel, can be nested together for shipping purposes. In a preferred embodiment, the wire mesh 24 that is secured to the mainframe or the outer tubular frame is disposed on opposite sides. This is illustrated in FIG. 10. This is not required as the wire mesh could be disposed immediately adjacent to each other when the two panels are nested together. In any event, the two panels can be secured together by wire ties or any other securement means and conveniently shipped. It is appreciated that by packaging the panels as just described, that the area and volume of the two panels are minimized and consequently provide a very efficient configuration for shipping. This configuration can substantially reduce the cost of shipping the kennel kit to distribution points and/or retail outlets.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A animal kennel kit that assumes: (1) an assembled mode and (2) a disassembled packaging and shipping mode, the kit comprising:

at least two small panels and at least two large panels;

each panel having an outer frame supporting an open mesh that extends between the outer frame and substantially covers the area bounded by the outer frame;

the outer frame of each small panel being sized to fit within the outer frame of each large panel;

wherein when the animal kennel kit assumes the assembled mode, a plurality of fasteners connect the outer frames of the small panels and the large panels end to end to form an enclosure;

wherein when the animal kennel kit assumes the disassembled packaging and shipping mode, the small panels and the large panels are disconnected and secured together in a nested configuration for shipment; and whereby in the nested configuration, at least one small panel is nested within the outer frame of at least one of the large panels such that the outer frame of the large panel extends around the outer frame of the nested small panel, and the outer frames of both the small panel and the large panel lie substantially in the same plane.

2. The animal kennel kit of claim 1 wherein when the animal kennel kit assumes the assembled mode, the small panels and the large panels are oriented with respect to each other such that the small panels are generally parallel to one another and the large panels are generally parallel to one another.

3. The animal kennel kit of claim 1 wherein the outer frame of each panel includes an upper member, a lower member, a pair of side members, and arcuate corners interconnecting the side members with the upper and lower members.

4. The animal kennel kit of claim 3 wherein when animal kennel kit is in the nested configuration, the outer frame of the small panel is nested within the outer frame or the large panel such that the respective upper, lower and side members of the small and large outer frames extend in general parallel relationship.

5. The animal kennel kit of claim 3 wherein the lower member of each small panel includes an aperture that receives an adjustable support leg to adjustably support the lower member of each small panel in spaced relationship with respect to the ground.

6. The animal kennel kit of claim 3 wherein each side member includes a lower aperture and an upper aperture to receive the plurality of fasteners.

7. The animal kennel kit of claim 6 wherein the plurality of fasteners comprise a step connector having a first vertical portion, a horizontal portion, and a second vertical portion vertically offset from the first vertical portion.

8. The animal kennel kit of claim 7 wherein the first vertical portion is inserted into the lower aperture of a first side member and the second vertical portion is inserted into the lower aperture of an adjacent side member, such that the horizontal portion rests on a lower portion of the lower aperture of the first side member and supports the upper portion of the lower aperture of the adjacent side member.

9. The animal kennel kit of claim 6 Wherein the plurality of fasteners further comprise a V-connector having a first leg, an apex, and a second leg.

10. The animal kennel kit of claim 9 wherein the first leg is inserted downwardly into the upper aperture of a first side member and the second leg is inserted downwardly into the upper aperture of an adjacent side member.

11. The animal kennel kit of claim 6 wherein the plurality of fasteners further comprise a gate connector having a first leg, a pull ring, a second leg, and a restraining hook, and wherein the first leg is shorter than the second leg.

* * * * *